United States Patent
Iyer et al.

(10) Patent No.: US 11,086,380 B2
(45) Date of Patent: Aug. 10, 2021

(54) MANAGEMENT OF BATTERY RUNTIME BASED UPON POWER SOURCE ACTIVITY

(71) Applicant: Dell Products, L.P., Round Rock, TX (US)

(72) Inventors: Vivek Viswanathan Iyer, Austin, TX (US); Richard C. Thompson, Cedar Park, TX (US)

(73) Assignee: Dell Products, L.P., Round Rock, TX (US)

( * ) Notice: Subject to any disclaimer, the term of this patent is extended or adjusted under 35 U.S.C. 154(b) by 63 days.

(21) Appl. No.: 16/578,051

(22) Filed: Sep. 20, 2019

(65) Prior Publication Data

US 2021/0089105 A1    Mar. 25, 2021

(51) Int. Cl.
*G06F 1/3206* (2019.01)
*G06F 1/324* (2019.01)
*G06F 1/3287* (2019.01)
*G06F 1/329* (2019.01)
*H02J 7/02* (2016.01)
*G06F 1/3234* (2019.01)
*G06F 1/3231* (2019.01)
*H02J 7/00* (2006.01)

(52) U.S. Cl.
CPC ............ *G06F 1/3206* (2013.01); *G06F 1/324* (2013.01); *G06F 1/329* (2013.01); *G06F 1/3231* (2013.01); *G06F 1/3265* (2013.01); *G06F 1/3287* (2013.01); *H02J 7/02* (2013.01); *H02J 7/022* (2013.01); *H02J 7/0048* (2020.01)

(58) Field of Classification Search
CPC ........ G06F 1/32; G06F 1/3203; G06F 1/3206; G06F 1/3212; G06F 1/3234; G06F 1/3237; G06F 1/324; G06F 1/3243; G06F 1/3265; G06F 1/3287; G06F 1/329; G06F 1/3296; H02J 7/02; H02J 7/022; H02J 7/027; H02J 2207/20; H02J 7/0047; H02J 7/0048; H02J 7/0701
See application file for complete search history.

(56) References Cited

U.S. PATENT DOCUMENTS

| | | | |
|---|---|---|---|
| 8,479,024 B2 | 7/2013 | Vichare et al. | |
| 9,197,092 B2 | 11/2015 | Verdun et al. | |
| 9,263,912 B2 | 2/2016 | Verdun et al. | |
| 9,831,700 B2 | 11/2017 | Verdun et al. | |
| 2013/0162430 A1* | 6/2013 | Scherzer | H04W 52/0261 340/539.13 |
| 2013/0191662 A1* | 7/2013 | Ingrassia, Jr. | G06F 1/3206 713/320 |

(Continued)

OTHER PUBLICATIONS

Microsoft, "Power Management Functions," 124 pages, retrieved Jan. 22, 2021, available at https://docs.microsoft.com/en-us/windows/win32/power/power-management-functions.

*Primary Examiner* — Thomas J. Cleary
(74) *Attorney, Agent, or Firm* — Fogarty LLP (57) ABSTRACT

Embodiments of systems and methods for managing battery runtime based upon power source activity are described. In some embodiments, a method may include determining, based at least in part upon location and context information, that a battery of an Information Handling System (IHS) is expected to be charged by a given alternating current (AC) adapter; and modifying one or more IHS settings to reduce a power consumption of the IHS in response to the determination.

18 Claims, 4 Drawing Sheets

(56) References Cited

U.S. PATENT DOCUMENTS

| | | | | |
|---|---|---|---|---|
| 2015/0123595 | A1* | 5/2015 | Hussain | H02J 7/00 |
| | | | | 320/107 |
| 2018/0198311 | A1* | 7/2018 | Abou Mahmoud | G06Q 10/20 |
| 2018/0351390 | A1* | 12/2018 | Venkatraman | H04B 5/0037 |
| 2018/0375344 | A1* | 12/2018 | Matsumura | H02J 7/00 |
| 2019/0157882 | A1* | 5/2019 | Sherback | B60L 53/11 |
| 2019/0196576 | A1 | 6/2019 | Grobelny et al. | |
| 2019/0305383 | A1* | 10/2019 | Muntes | H01M 10/425 |
| 2020/0139842 | A1* | 5/2020 | Logvinov | B60L 53/68 |
| 2020/0266649 | A1* | 8/2020 | Lee | H04W 52/028 |

* cited by examiner

MANAGEMENT OF BATTERY RUNTIME BASED UPON POWER SOURCE ACTIVITY

FIELD

The present disclosure relates generally to Information Handling Systems (IHSs), and more particularly, to systems and methods for managing battery runtime based upon power source activity.

BACKGROUND

As the value and use of information continue to increase, individuals and businesses seek additional ways to process and store it. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Examples of portable (IHSs) include notebook computers, tablet components, mobile phones, and personal data assistants (PDAs). Portable IHSs are typically powered by an external alternating current (AC) power source supplied by an AC adapter when connected to an AC power source (i.e., when the system is "plugged in") and by rechargeable batteries (e.g., lithium ion or nickel metal hydride battery packs) when disconnected from the AC power source (i.e., when the system is "unplugged" or in "mobile use"). In some cases, a portable IHS may also receive power supplied via a wired bus (e.g., Universal Serial Bus or "USB" Type-C) or wirelessly via an inductive charging pad.

In various implementations, an IHS's rechargeable battery may be used as a supplemental or dual power source when the IHS is plugged in and connected to another power source. For example, a rechargeable battery may provide supplemental power to a plugged-in IHS when the IHS's processor enters a turbo mode, and/or when an undersized AC adapter, USB-C source, inductive charging pad, or the like is used to support the power consumption of the IHS.

SUMMARY

Embodiments of systems and methods for managing battery runtime based upon power source activity are described. In an illustrative, non-limiting embodiment, a method may include determining, based at least in part upon location and context information, that a battery of an Information Handling System (IHS) is expected to be charged by a given alternating current (AC) adapter; and modifying one or more IHS settings to reduce a power consumption of the IHS in response to the determination.

For example, the location information may be selected from the group consisting of: a building, an office, a cubicle, a desk, a hallway, a corridor, a cafeteria, and a conference room. Meanwhile, the context information may be selected from the group consisting of: user's presence, lid state, hinge angle, IHS movement, software application under execution, and meeting information.

In some cases, determining that the battery is expected to be charged by the given AC adapter may include comparing the location and context information against historical location and context information associated with prior AC adapter usage. The method may also include modifying the one or more IHS settings in response to a projected charge time. The method may further include modifying the one or more IHS settings in response to a projected travel time between a first IHS location and a second IHS location.

In other cases, modifying the one or more IHS settings may include at least one of: reducing a clock speed of a component of the IHS, placing a component of the IHS in standby, turning off a component of the IHS, dimming a component of the IHS, or shutting down an executed application. The given AC adapter may provide a maximum power lesser than a power provided by a nominally-sized AC adapter when the IHS is turned off. Moreover, reducing the power consumption may include matching a DC runtime achievable by charging the battery with the given AC adapter to another DC runtime achievable by charging the battery with the nominally-sized AC adapter.

In another illustrative, non-limiting embodiment, an IHS may include: a processor, a memory coupled to the processor, the memory having program instructions stored thereon that, upon execution by the processor, cause the IHS to: determine that a battery of the IHS is expected to undergo a charge event; and modify a power consumption of the IHS in anticipation of the charge event.

To determine that the battery is expected to undergo the charge event, the program instructions, upon execution, may cause the IHS to identify a location of the IHS, where the location is selected from the group consisting of: an office, a retail establishment, a vehicle, an airport, a train station, an airplane, and a train. Additionally, or alternatively, to determine that the battery is expected to undergo the charge event, the program instructions, upon execution, may cause the IHS to identify a context of the IHS, where the context is selected from the group consisting of: user's presence, lid state, hinge angle, IHS movement, launched application, and calendar information. Yet additionally or alternatively, to determine that the battery is expected to undergo the charge event, the program instructions, upon execution, may cause the IHS to identify a power rating of an AC adapter expected to be used during the charge event, where the given power rating is smaller than another power rating of another AC adapter shipped with the IHS.

To modify the power consumption, the program instructions, upon execution, may cause the IHS to reduce the power consumption until the expected charge event by performing at least one of: reducing a processor's maximum clock speed or dimming a display. Additionally, or alternatively, to modify the power consumption, the program instructions, upon execution, may cause the IHS to determine an expected duration of the charge event. To modify the power consumption, the program instructions, upon execution, may cause the IHS to match a DC runtime achievable after charging the battery with the given power source to another DC runtime achievable after charging the battery with another AC adapter shipped with the IHS.

In yet another illustrative, non-limiting embodiment, a memory storage device may have program instructions stored thereon that, upon execution by one or more processors of an Information Handling System (IHS), cause the IHS to: determine that a battery of the IHS is expected to undergo a charge event; and modify a setting of the IHS to reduce a power consumption of the IHS in anticipation of the charge event.

In some cases, to determine that the battery is expected to undergo the charge event, the program instructions, upon execution, may cause the IHS to identify a power source to be used during the charge event based upon historical charging data. Additionally, or alternatively, to determine that the battery is expected to undergo the charge event, the program instructions, upon execution, may cause the IHS to identify a power rating of the power source based upon historical charging data. Additionally, or alternatively, to determine that the battery is expected to undergo the charge event, the program instructions, upon execution, may cause the IHS to identify a duration of the charge event based upon historical charging data.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Systems and methods described herein may be used for managing battery runtime based upon power source activity. As part of a contextual battery management operation, these systems and methods may adaptively optimize battery runtime in an Information Handling System (IHS), for example, in the case of a mobile worker or "corridor warrior." These techniques may also be applicable to situations where a user employs undersized alternating current (AC) adapters—which can otherwise slowly deplete the IHS's battery and reduce runtime.

As used herein, the term "undersized" adapter or power source refers to an adapter or power source that is not capable of delivering the maximum charging rate to the IHS's internal battery under a given usage scenario. Generally, AC adapters and power sources come in all sizes and ratings (e.g., travel adapters, dock adapters, conference room adapters, etc.). Even with the default IHS's AC adapter (i.e., the power adapter that the IHS ships with), however, fast battery charging is not guaranteed unless the IHS is turned off because default adapters cannot run an IHS in performance mode and fast charge the battery simultaneously. In various embodiments, an "undersized" adapter or power source is one that is not large enough to allow the IHS's free running and fast battery charge at the same time—or any usage scenario where the battery is not receiving its maximum charge rate.

A typical corridor warrior or business executive using a portable IHS runs from meeting-to-meeting, even while not traveling, and uses various pre-wired room AC adapters to charge the IHS on-the-go. The same user might spend some time at desk, office, or cubicle between meetings with a properly-sized AC adapter. But conference rooms, cafeterias, and other locations (e.g., airplanes, airports, trains, train stations, retail establishments, car, etc.) may have varying AC adapter capacities—some undersized with respect to the user's mobile IHS. In this scenario, it would be important for the user to be able to achieve targeted runtime, such as by compromising performance for power, so that the IHS can operate until the end of the day.

To address these issues, systems and methods described herein may employ a historical context of past AC adapter or power source usage, for example, tied to indoor location and other system contextual data, that can be gathered and learned from, to project a targeted charge time, thereby allowing to estimate or project direct current (DC; or undersized AC) runtime for a given user—and from it derive a graded throttling performance slope that enables the IHS to achieve a targeted battery or DC runtime.

In some embodiments, a software service may be executed by an embedded controller (EC) of the IHS to perform real-time inferences on learned data of past adapter usages (ML-PAU), which may be stored as a machine learning (ML) or artificial intelligence (AI) model on the IHS itself or on the cloud, to contextually maximize battery runtime to empty charge in DC mode or undersized AC mode, by setting slope and/or bias to a "performance level" or "throttling level" as a function of battery leftover time to empty. Additionally, or alternatively, an IHS's Operating System (OS) service may interface with the EC, such that the inference is performed at the OS level, and the IHS's EC receives and applies the bias to produce a graded throttling.

For example, EC-driven throttling of a central processing unit (CPU) and/or graphical processing unit (GPU) to lower power states (p-states) may be applied, as well as other throttling mechanisms such as storage power management, etc., to contextually trade off responsiveness and performance for maximum battery time to empty discharge, along with maximum throttling level when a user is absent.

As such, in various embodiments, systems and methods described herein may serve to extend a battery's projected runtime by employing power management techniques that may take into account, for example: anticipated charge and discharge events throughout the day (or other selected usage period), travel adapter (smaller or "undersized" power source), or outlet/current limited (e.g., airplane), or docked (with a larger or "oversized" power source).

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 1:
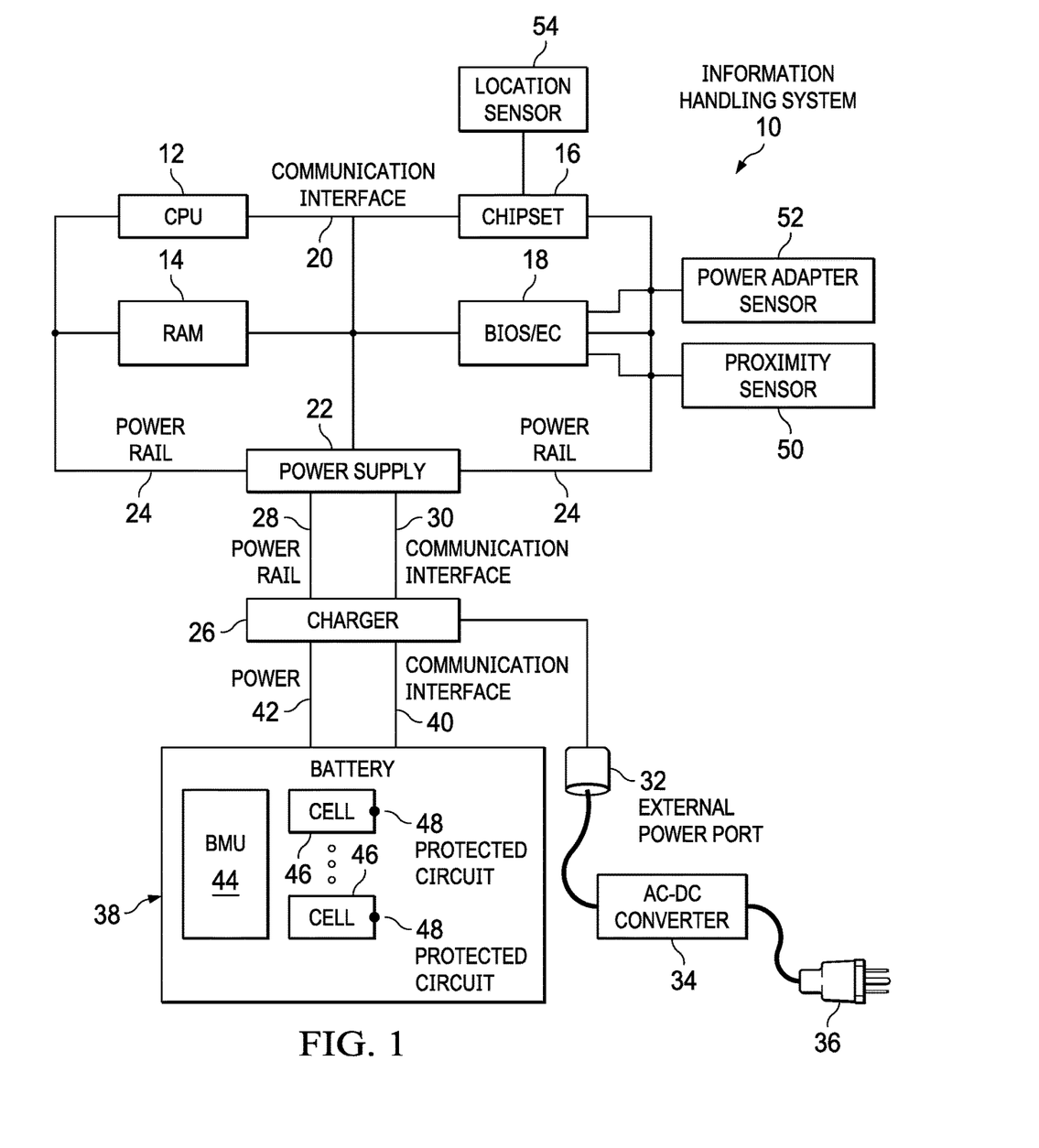
FIG. 1 is a block diagram an example of an Information Handling System (IHS) configured to manage battery runtime based upon power source activity, according to some embodiments.

Referring now to FIG. 1, a block diagram depicts IHS 10 configured to manage battery runtime based upon power source activity. In this example, CPU 12 executes instructions to process information, such as instructions of an OS (e.g., WINDOWS, MACOS, iOS, ANDROID, LINUX, etc.) or application. Random access memory (RAM) 14 stores the instructions and information, such as after retrieval from persistent storage of a hard disk drive or solid-state drive. Chipset 16 interfaces with CPU 12 to manage CPU operations, such as clock speed and power consumption. As an example, chipset 16 may include a Platform Controller Hub (PCH) that supports a processor turbo mode having increased clock speed and power consumption.

BIOS (Basic Input/Output System)/embedded controller (EC) 18 interface with CPU 12 and chipset 16 to coordinate power use and interactions with other physical components, such as networking, peripheral interfaces, etc. BIOS 18 instruction may be stored in a non-volatile memory accessible by chipset 16 via bus 20. Upon powering or restarting IHS 10, CPU 12 may utilize BIOS 18 instructions to initialize and test hardware components coupled to the IHS 10. BIOS 18 instructions may also load an OS for use by IHS 10.

Communication interface 20 provides communication between CPU 12, RAM 14, chipset 16 and BIOS/EC 18, and may include a variety communications links, such as PCI, PCI Express, I2C, SMBus and other wirelines and pins interfaced through a motherboard. In various embodiments, IHS 10 may include a variety of other hardware components, such as networking components, graphics components, an integrated display, etc.

IHS 10 includes power supply 22 that provides regulated power to processing components through one or more power rails 24. Power supply 22 maintains a selected voltage level on power rails 24 to within defined constraints for the processing components by adjusting current to the processing components as power demands shift. In various embodiments, one or more power supplies may feed current to different power rails that meet the constraints of different processing components, such as different rails that have different voltages.

In some embodiments, chipset 16 may interface with power supply 22 and/or EC 18 to communicate expected CPU processing bursts, such as when CPU 12 enters a turbo boost mode. Generally, proper operation of processing components calls for regulated voltage levels with varying current by IHS power supplies 22.

In this example, charger 26 interfaces with power supply 22 through power rail 28 and communication interface 30 to provide power from external power port 32 and/or internal IHS battery 38. During normal operation, charger 26 accepts power from an external power source, such as an AC-DC converter 34 and alternating current source 36 and provides the external power to power supply 22 to power processing components of IHS 10. Charger 26 uses excess power that is not drawn by power supply 22 to charge battery 38 through power interface 42 supported by a communication interface 40.

For example, battery 38 includes battery management unit (BMU) 44 that manages charge and discharge of individual battery cells 46, such as by metering current to battery cells 46. For instance, BMU 44 may include a controller configured to receive a command that sets a maximum charge current. In some embodiments, battery cells 46 are lithium ion battery cells with a nominal voltage of 3.7V that are coupled in series to operate at multiples of the nominal voltage.

Battery charge and protection are managed as a battery pack with individual battery cells 46 having charge parameters monitored by BMU 44 and battery protection enforced by isolating the battery pack in the event of a failure. In an alternative embodiment, each battery cell 46 has a protection circuit 48 that automatically disconnects the battery cell 46 in the event of a battery over voltage or over current event. As an example, battery 38 may include eight cells 46 configured in series and parallel to operate at a nominal voltage of 14.8V, and AC-DC converter 34 may provide current to charger 26 at the nominal voltage so that charger 26 directs power to battery 38 at the nominal voltage when excess power is available based on power supply 22 draw.

When CPU 12 initiates turbo mode with its associated increase in clock speed and current draw, for example, external power port 32 cannot draw adequate power for power supply 22 to maintain voltage constraints of CPU 12. For instance, external power port 32 may be a USB Type C port that has a 100 W power limit, which is less than the maximum power draw of power supply 22—that is, power port 32 is "undersized" with respect to IHS 10. As another example, AC-DC converter 34 may lack power conversion sufficient to fully supply power supply 22 during peak power consumption—in the case of an "undersized" AC adapter.

In order to operate the processing components during peak power draw, power supply 22 simultaneously draws power from both external power port 32 and battery 38, such as with Dynamic Battery Power Technology (DBPT). When power supply 22 draws the maximum power available for external power port 32, battery 38 is allowed to discharge so that the combined power available from battery 38 and external power port 32 will meet the power demands of power supply 22. Again, in some cases, chipset 16 provides a signal to charger 26, power supply 22, and/or EC 18 to indicate that turbo mode is active.

As illustrated, chipset 16 may utilize a sensor hub or the like capable of sampling and/or collecting data from a variety of sensors. For instance, such a sensor hub may utilize location sensor(s) 54, including global positioning system (GPS), wireless networking (e.g., WiFi, Bluetooth, etc.) sensors, or other radio frequency (RF) sensors (e.g., configured to detect RFID tags), that may be configured to provide an indication of an IRS's physical location.

In some cases, location sensor 54 may be configured to determine the position of IHS 10 with respect to a specific one of a plurality of buildings, offices, cubicles, desks, hallways, corridors, cafeterias, or conference rooms. Additionally, or alternatively, location sensor 54 may be configured to determine the position of IHS 10 with respect to a specific one of a plurality of retail establishments, vehicles, airports, airplanes, train stations, or trains.

As illustrated, IHS 10 embodiments may utilize embedded controller (EC) 18 that may be a motherboard component of IHS 100 and may include one or more logic units. EC 18 may interface with BMU 44, and it may control maximum clock values, power states (p-state) manager for CPU, GPUs etc. through PECI (processor-to-EC) interface in run-time after initial settings are received from the BIOS (e.g., at boot up).

EC 18 may also implement operations for managing power for IHS 10. These operations may be utilized to determine the power status of IHS 10, such as whether IHS 10 is operating from battery power or is plugged into an AC power source (e.g., whether the IHS is operating in AC-only mode, DC-only mode, or AC—plus—DC mode).

As shown, EC 18 may utilize proximity sensor(s) 50, including optical, infrared, and sonar sensors, that may be configured to provide an indication of a user's presence near IHS 100, absence from IHS 100, and/or physical distance from IHS 100 (e.g., near-field, mid-field, or far-field).

EC 18 may also implement operations for interfacing with power adaptor sensor 52 in managing power for IHS 10. These operations may be utilized to determine the power status of IHS 10, such as whether IHS 10 is operating from battery power or is plugged into an AC power source (e.g., whether the IHS is operating in AC-only mode, DC-only mode, or AC+DC mode). In some embodiments, EC 18 and chipset 16 may communicate with each other, for example, to exchange sensed data, via an out-of-band signaling pathway or bus.

In some cases, adapter 34 may provide output rating information. For example, in legacy barrel adapters, IHS 10 may use the adapter's PSID and a look-up table (LUT) to determine the adapter's ratings. In other examples, an USB-PD controller may negotiate a power delivery contract with IHS 10.

In various embodiments, IHS 10 may not include each of the components shown in FIG. 1. Additionally, or alternatively, IHS 10 may include various other components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor(s) 101 as a systems-on-a-chip.

Figure 2:
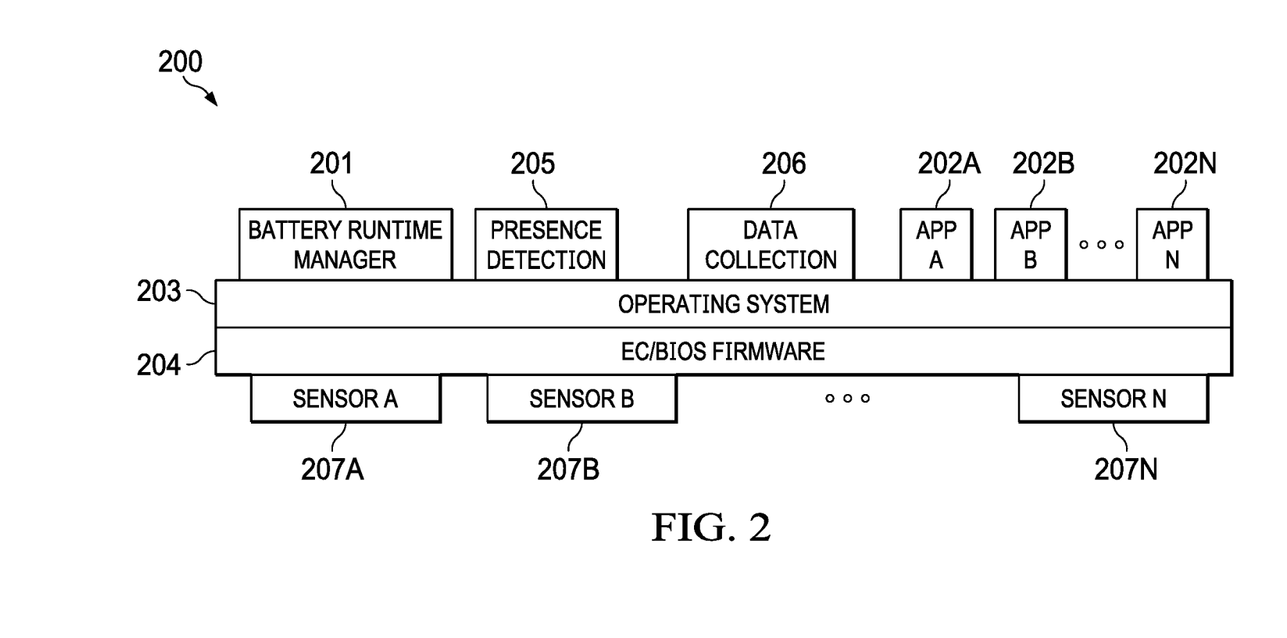
FIG. 2 is a block diagram illustrating an example of a software environment produced by an IHS for managing battery runtime based upon power source activity, according to some embodiments.

FIG. 2 is a block diagram illustrating an example of software environment 200 produced by IHS 10 for managing battery runtime based upon power source activity. In some embodiments, each element of software environment 200 may be provided by IHS 10 through the execution of program instructions by one or more logic components such as, for example, CPU 12 or EC 18, stored in memory (e.g., RAM 14), storage device(s), and/or firmware.

As shown, software environment 200 includes battery runtime manager 201 configured to manage battery runtime during execution of applications 202A-N using data received from presence detection module 205 and data collection engine 206. Examples of applications 202A-N include, but are not limited to, computing resource-intensive applications such as ADOBE ILLUSTRATOR, ADOBE AFTER EFFECTS, ADOBE MEDIA ENCODER, ADOBE PHOTOSHOP, ADOBE PREMIER PRO, AUTODESK AUTOCAD, AVID MEDIA COMPOSER, ANSYS FLUENT, ANSYS WORKBENCH, SONAR CAKEWALK, and the like; as well as less resource-intensive applications, such as media players, web browsers, document processors, email clients, etc.

Both battery runtime manager 201 and applications 202A-N may be executed by OS 203, which is in turn supported by EC/BIOS instructions or firmware 204. EC/BIOS firmware 204 is in communications with, and configured to receive data collected by, sensor modules or drivers 207A-N—which may abstract and/or interface with proximity sensor(s) 50, power adapter sensor(s) 52, and/or location sensor(s) 54, for example. In other cases, however, battery runtime manager 201 may be integrated into EC 18. In various embodiments, software environment 200 also includes presence detection module or application programming interface (API) 205 and data collection module or API 206 executed above OS 203.

In some implementations, presence detection module 205 may process user presence data received by one or more of sensor modules 207A-N and it may determine, for example, whether an IHS's end-user is present or absent. Moreover, in cases where the end-user is present before the IHS, presence detection module 205 may further determine a distance of the end-user from the IHS continuously or at pre-determined time intervals. The detected or calculated distances may be used by presence detection module 205 to classify the user as being in the IHS's near-field (user's position<threshold distance A), mid-field (threshold distance A<user's position<threshold distance B, where B>A), or far-field (user's position>threshold distance C, where C>B).

Data collection engine 206 may include any data collection service or process, such as, for example, the DELL DATA VAULT configured as a part of the DELL SUPPORT CENTER that collects information on system health, performance, and environment. In some cases, data collection engine 206 may receive and maintain a database or table that includes information related to IHS hardware utilization (e.g., by application, by thread, by hardware resource, etc.), power source (e.g., AC-plus-DC, AC-only, or DC-only), IHS location (e.g., GPS coordinates, wireless access point, RFID tags, etc.), and the like.

Figure 3:
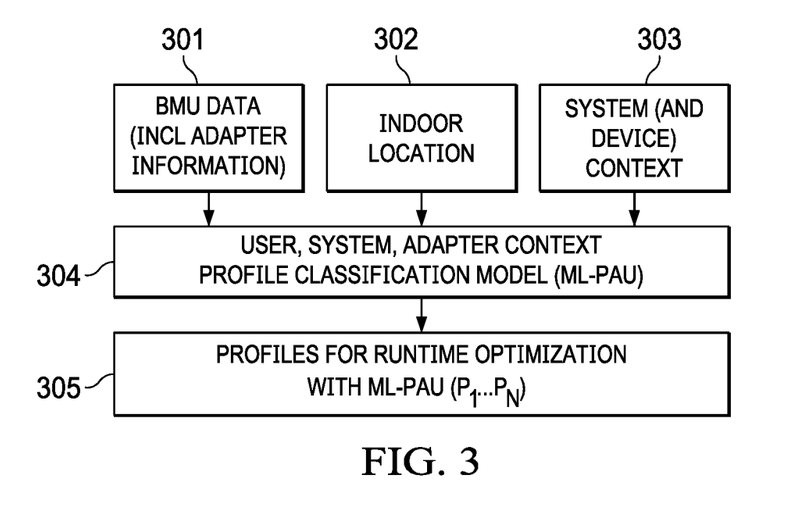
FIG. 3 is a flowchart illustrating an example of a method for creating power source activity profiles, according to some embodiments.

FIG. 3 is a flowchart illustrating an example of method 300 for creating power source activity profiles. In some embodiments, method 300 may be performed by battery runtime manager 201 under execution by CPU 12 and/or EC 18. Particularly, at block 301, method 300 may receive BMU data, including adapter information (e.g., ID, serial number, output power rating, etc.). Additionally, or alternatively, adapter information may be received from power adaptor sensor 52.

At block 302, method 300 may receive IHS location information (e.g., indoor or outdoor location), for example, from location sensor 54. And, at block 303, method 300 may receive IHS context information including one or more of, for example: user's presence state (e.g., present, near-field, mid-field, far-field, absent), lid state (e.g., of laptop), hinge angle (e.g., between a display portion and a keyboard portion of the IHS), IHS movement (e.g. from an accelerometer or gyroscopic sensor), software application(s) under execution, and meeting/conference information obtained from a calendaring application executed by the IHS. Examples of meeting or conference information include, but are not limited to: a duration, a location, and/or the IHS's user's role (e.g., participant, presenter, manager, executive, etc.).

Block 304 may assemble data obtained via blocks 301-303, in addition to data related to historical charging events (e.g., duration, AC adaptor available at a given location, etc.)

for the IHS using any suitable machine learning algorithm into a profile classification model (ML-PAU). Finally, block 305 may make available a number of different profiles for runtime optimization with ML-PAU ($P_1, \ldots, P_N$).

In some cases, a profile for battery runtime optimization may include information indicated in Table I below:

TABLE I

Runtime Profile "A"

BMU data
Session time, battery charge (e.g., time series from start to end)
Indoor location (e.g., office, conference room, etc.)
IHS context (user presence state, posture, hinge angle, etc.)

Each profile for battery runtime optimization may be associated with a number of IHS settings (e.g., maximum turbo for each component, standby mode for each component, amount of display dimming, etc.) and/or power state(s) (p-states) that further throttle the IHS's performance (sometimes already throttled in DC mode) in anticipation of a charge event. Such additional throttling may extend the IHS's battery runtime—e.g., when the expected/upcoming charge event uses an undersized AC adapter—to match the battery runtime duration as if such charge event used a nominally- or properly-sized AC adapter (i.e., one with the same or greater output power rating as the one designed for and/or which ships with, the IHS).

Figure 4:
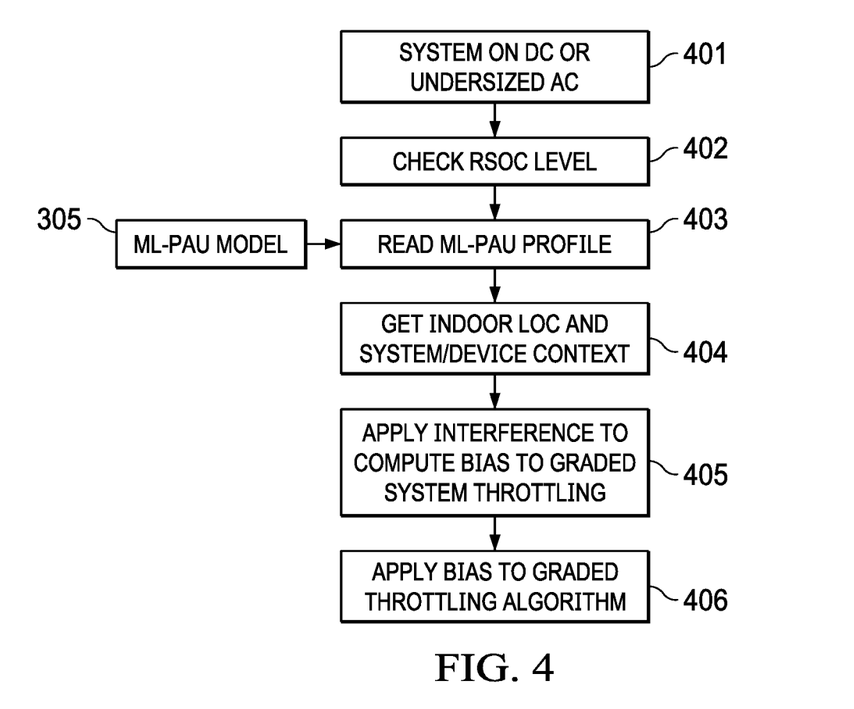
FIG. 4 is a flowchart illustrating an example of a method for managing battery runtime based upon power source activity, according to some embodiments.

FIG. 4 is a flowchart illustrating an example of method 400 for managing battery runtime based upon power source activity. In some embodiments, method 400 may be performed by battery runtime manager 201 under execution by CPU 12 and/or EC 18. Particularly, at block 401, method 400 may determine whether a portable IHS is operating in DC or undersized AC charging mode; and, at block 402, method 400 may evaluate a present battery charge level (RSOC). At block 403, method 400 may retrieve ML-PAU model 305 and read one or more profiles for battery runtime optimization.

Then, at block 404, method 400 may obtain the IHS's present indoor location and context information. At block 405, method 400 may infer or determine, based at least in part upon the location and context information, that the IHS's battery is expected to be charged by a particular power source or type of power source (e.g., an undersized AC adapter), for a certain amount of time, at a specified time and place in the future, based upon a closest matching profile.

At block 406, and in anticipation of the expected charge event, method 400 may apply a bias to the IHS's performance by modifying one or more IHS settings to reduce a power consumption of the IHS using a throttling algorithm based upon the matching profile and/or present battery charge level. In some cases, the throttling algorithm may also use presence detection and further throttle performance in a manner proportional to the user's presence/absence and/or near-, mid-, far-field distances.

Alternatively, in anticipation of an expected charge event where the IHS is expected to be charged by a power source that is larger than a nominally- or properly-rated AC adapter (e.g., a docking station), method 400 may modify the one or more IHS settings to increase a power consumption of the IHS while the mobile IHS operates in DC mode.

Figure 5A:
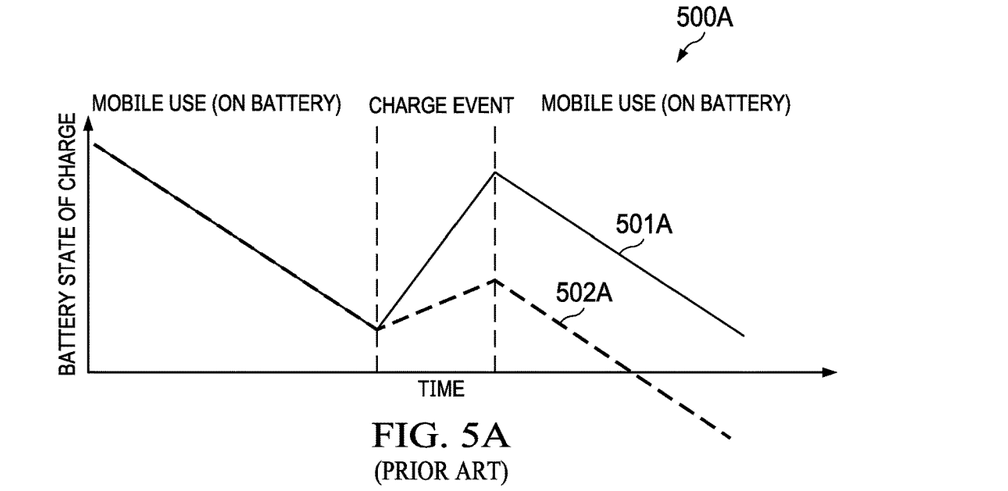
FIGS. 5A-5C are charts illustrating examples of applications of a system and method for managing battery runtime based upon power source activity, according to some embodiments.
Figure 5B:
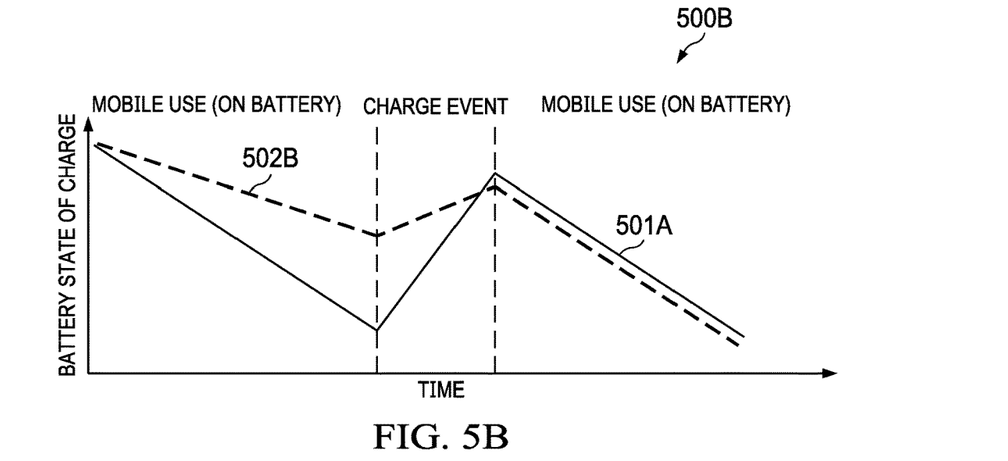
Figure 5C:
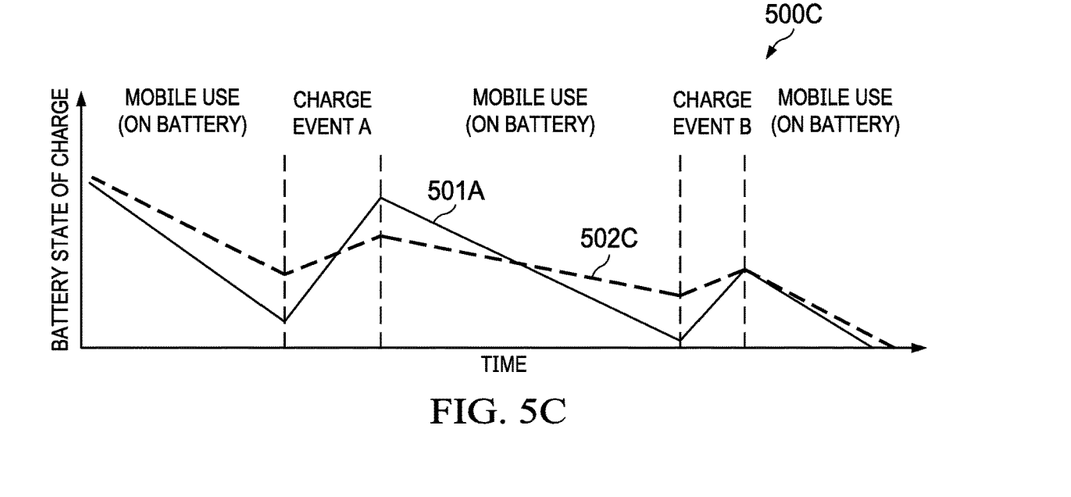

FIGS. 5B and 5C are charts illustrating an application of a system and method for managing battery runtime based upon power source activity. In contrast, FIG. 5A shows a conventional use-case that does not employ the techniques described herein.

In graph 500A of FIG. 5A, curve 501A shows a battery "state of charge" changing over time, which begins at a high level when the IHS is operating in mobile or DC use, and it declines as power is consumed by the IHS, until a charge event takes place. The charge event for curve 501A uses a nominally- or properly-sized AC adapter for the IHS. Hence, when the charge event happens, the battery charge increases. Then, when the charge event is over, the battery again discharges.

Still referring to graph 500A of FIG. 5A, curve 502A shows what happens when an undersized AC adapter is used during the charge event. In curve 502A, no adjustment is made for the undersized AC adapter when the IHS begins operating in mobile or DC use. Because the IHS's battery charges at a slower rate during the charge event (with a smaller slope), when the charge event is over, the battery is not as fully charged as in curve 501A, and therefore the battery runtime or duration of curve 502A is shorter than that of curve 501A (i.e., it crosses the horizontal axis representing an empty battery sooner).

Now with respect to FIG. 5B, in graph 500B curve 501A again illustrates the use of a nominally- or properly-sized AC adapter during the charge event, and therefore it is the same as in graph 500A of FIG. 5A—that is, mobile operation of the IHS is agnostic as to the type of power source expected to be used in a charge events. In contrast, however, curve 502B illustrates what happens when an undersized AC adapter is expected to be used in an upcoming charge event using the systems and methods described herein.

Particularly, when mobile or DC use starts, method 400 is executed to reduce battery consumption using performance throttling (as indicated by a smaller down-slope in curve 502B than in curve 501A) in anticipation of the expected charge event. For instance, IHS settings (e.g., reduced turbo settings, dimming of display, etc.) may be selected to reduce power consumption, for example, depending upon the user's location and/or other context information. As a result, despite the use of an undersized AC adapter during the charge event, at the end of the charge event, the battery has a similar charge level as in curve 501A (that is, as it if had used a properly-sized AC adapter). As a result, the battery runtime shown in curve 502B is modified to more closely match the battery runtime of curve 501A (i.e., both curves cross the horizontal axis at the same time).

Graph 500C of FIG. 5C illustrates the optimization of battery runtime across multiple charge and discharge sessions. Particularly, in this example, charge event B follows charge event A, and charge event B has a shorter duration than charge event A. Curve 501A again illustrates the use of a nominally- or properly-sized AC adapter across both charge events, and therefore it is similar as the one shown in FIGS. 5A and 5B—that is, mobile operation of the IHS is agnostic as to the type or output capacity of the power source. The upward slope of curve 501A during charge event A is the same as during charge event B. Moreover, the downward slope of curve 501A before charge event A, between charge events A and B, and after charge event B is also approximately the same.

Meanwhile, curve 502C shows a first downward slope during mobile use in anticipation of charge event A based upon a first set of IHS settings, and a smaller down-slope between charge events A and B based upon a stricter set of IHS settings. That is because during charge event A, the upward slope of curve 502C is such that the battery does not charge to the same level as in curve 501A. Hence, after charge event A and in anticipation of charge event B, method 400 applies more performance throttling in order to further reduce the rate of discharge of the battery when on mobile use. Still referring to curve 502C, the upward slope of charge event B is the same as that of charge event A, but this time the battery charge level catches up to that of curve 501A. After charge event B, curves 501A and 501C are allowed to have approximately the same downward slope (e.g., as the user approaches the end of the business day).

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method, comprising:
    determining, based at least in part upon location and context information, that a battery of an Information Handling System (IHS) is expected to be charged by a given undersized alternating current (AC) adapter; and
    modifying one or more IHS settings to reduce a power consumption of the IHS in response to the determination.

2. The method of claim 1, wherein the location information is selected from the group consisting of: a building, an office, a cubicle, a desk, a hallway, a corridor, a cafeteria, and a conference room.

3. The method of claim 1, wherein the context information is selected from the group consisting of: user's presence, lid state, hinge angle, IHS movement, software application under execution, and meeting information.

4. The method of claim 1, wherein determining that the battery is expected to be charged by the given AC adapter further comprises comparing the location and context information against historical location and context information associated with prior AC adapter usage.

5. The method of claim 1, further comprising modifying the one or more IHS settings in response to a projected charge time.

6. The method of claim 1, further comprising modifying the one or more IHS settings in response to a projected travel time between a first IHS location and a second IHS location.

7. The method of claim 1, wherein modifying the one or more IHS settings further comprises at least one of: reducing a clock speed of a component of the IHS, placing a component of the IHS in standby, turning off a component of the IHS, dimming a component of the IHS, or shutting down an executed application.

8. The method of claim 1, wherein reducing the power consumption further comprises matching a DC runtime achievable by charging the battery with the given AC adapter to another DC runtime achievable by charging the battery with the nominally-sized AC adapter.

9. An Information Handling System (IHS), comprising:
    a processor; and
    a memory coupled to the processor, the memory having program instructions stored thereon that, upon execution by the processor, cause the IHS to:
        determine that a battery of the IHS is expected to undergo a charge event using a properly-rated alternating current (AC) adapter; and
        increase a power consumption of the IHS in anticipation of the charge event.

10. The IHS of claim 9, wherein to determine that the battery is expected to undergo the charge event, the program instructions, upon execution, further cause the IHS to identify a location of the IHS, wherein the location is selected from the group consisting of: an office, a retail establishment, a vehicle, an airport, a train station, an airplane, and a train.

11. The IHS of claim 9, wherein to determine that the battery is expected to undergo the charge event, the program instructions, upon execution, further cause the IHS to identify a context of the IHS, wherein the context is selected from the group consisting of: user's presence, lid state, hinge angle, IHS movement, launched application, and calendar information.

12. The IHS of claim 9, wherein to determine that the battery is expected to undergo the charge event, the program instructions, upon execution, further cause the IHS to identify a power rating of the AC adapter.

13. The IHS of claim 12, wherein to increase the power consumption, the program instructions, upon execution, further cause the IHS to initiate turbo mode.

14. The IHS of claim 9, wherein to increase the power consumption, the program instructions, upon execution, further cause the IHS to determine an expected duration of the charge event.

15. A memory storage device having program instructions stored thereon that, upon execution by one or more processors of an Information Handling System (IHS), cause the IHS to:
  determine whether a user of the IHS is present;
  determine that a battery of the IHS is expected to undergo a charge event using an undersized alternating current (AC) adapter; and
  modify a setting of the IHS to reduce a power consumption of the IHS in proportion to the presence of the user in anticipation of the charge event.

16. The memory storage device of claim 15, wherein to determine that the battery is expected to undergo the charge event, the program instructions, upon execution, further cause the IHS to identify a power source to be used during the charge event based upon historical charging data.

17. The memory storage device of claim 16, wherein to determine that the battery is expected to undergo the charge event, the program instructions, upon execution, further cause the IHS to identify a power rating of the power source based upon historical charging data.

18. The memory storage device of claim 17, wherein to determine that the battery is expected to undergo the charge event, the program instructions, upon execution, further cause the IHS to identify a duration of the charge event based upon historical charging data.

* * * * *